(12) United States Patent
Favalora et al.

(10) Patent No.: US 10,599,098 B2
(45) Date of Patent: Mar. 24, 2020

(54) METHOD AND APPARATUS FOR LIGHT FIELD GENERATION

(71) Applicant: The Charles Stark Draper Laboratory, Inc., Cambridge, MA (US)

(72) Inventors: Gregg E. Favalora, Bedford, MA (US); Steven J. Spector, Lexington, MA (US); Benjamin F. Lane, Sherborn, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 35 days.

(21) Appl. No.: 15/876,719

(22) Filed: Jan. 22, 2018

(65) Prior Publication Data

US 2018/0210394 A1    Jul. 26, 2018

Related U.S. Application Data

(60) Provisional application No. 62/450,855, filed on Jan. 26, 2017.

(51) Int. Cl.
| | | |
|---|---|---|
| G03H 1/04 | (2006.01) | |
| H04N 13/305 | (2018.01) | |
| H04N 13/32 | (2018.01) | |
| G03H 1/00 | (2006.01) | |
| G02F 1/295 | (2006.01) | |

(52) U.S. Cl.
CPC ......... *G03H 1/0443* (2013.01); *H04N 13/305* (2018.05); *H04N 13/32* (2018.05); *G02F 1/2955* (2013.01); *G02F 2202/36* (2013.01); *G03H 2001/0088* (2013.01)

(58) Field of Classification Search
CPC ......... G03H 1/0443; G03H 2001/0088; H04N 13/32; H04N 13/305; G02F 2202/36; G02F 1/2955
USPC .......................................................... 348/40
See application file for complete search history.

(56) References Cited

U.S. PATENT DOCUMENTS

| | | | |
|---|---|---|---|
| 6,927,886 B2 | 8/2005 | Plesniak et al. | |
| 7,864,419 B2 | 1/2011 | Cossairt et al. | |
| 8,988,754 B2 | 3/2015 | Sun et al. | |
| 2009/0323121 A1* | 12/2009 | Valkenburg | G01B 11/002 358/1.18 |
| 2014/0192394 A1* | 7/2014 | Sun | G02B 6/26 359/289 |
| 2015/0346340 A1 | 12/2015 | Yaacobi et al. | |

(Continued)

OTHER PUBLICATIONS

Halle, "Holographic stereograms as discrete imaging systems," *SPIE Proceeding, No. 2176 "Practical Holography VIII"*, 12 pages (Feb. 1994).

(Continued)

*Primary Examiner* — Allen C Wong
(74) *Attorney, Agent, or Firm* — Sunstein Kann Murphy & Timbers LLP

(57) ABSTRACT

A nanophotonic phased array is configured to generate dynamic three-dimensional imagery when employed as an oscillatory beam-steering device. A scanning nanophotonic phased array generates programmable light fields. That is, a phased array generates reconfigurable light fields when controlled to perform an angular scan of incident illumination synchronized with respect to modulation of the incident illumination.

21 Claims, 16 Drawing Sheets

DISPLAY OF SCENE DATA

(56) References Cited

U.S. PATENT DOCUMENTS

2017/0003507 A1* 1/2017 Raval ................ G02B 27/0172

OTHER PUBLICATIONS

Holliman et al., "Three-Dimensional Displays: A Review and Applications Analysis," *IEEE Trans. Broadcasting*, pp. 362-371 (2011).
Chun et al., "Spatial 3D Infrastructure: display-independent software framework, high-speed rendering electronics, and several new displays," *Stereoscopic Displays and Virtual Reality Systems XII*, (ed. Woods et al.), Proc. SPIE-IS&T Electronic Imaging, SPIE, vol. 5664, pp. 302-312 (2005).
Geng, "Three-dimensional display technologies," *Advances in Optics and Photonics*, vol. 5, pp. 456-535 (2013).
Lucente, "Computational holographic bandwidth compression," *IBM Systems Journal*, vol. 35, pp. 349-365 (1996).
Sun et al., "Large-scale nanophotonic phased array," *Nature*, vol. 493, pp. 195-199 (2013).
Halle, "Autostereoscopic displays and computer graphics," *Computer Graphics*, ACM SIGGRAPH, vol. 31, No. 2, pp. 58-62 (1997).
Ashtiani et al., A Liquid Optical Phase Shifter With an Embedded Electrowetting Actuator, *Journal of Microelectromechanical Systems*, vol. 26, No. 2, pp. 305-307 (Apr. 2017).
European Patent Office, Invitation to Pay Additional Fees and, Where Applicable, Protest Fees—International Application No. PCT/US2018/014668, dated May 14, 2018, 16 pages.

* cited by examiner

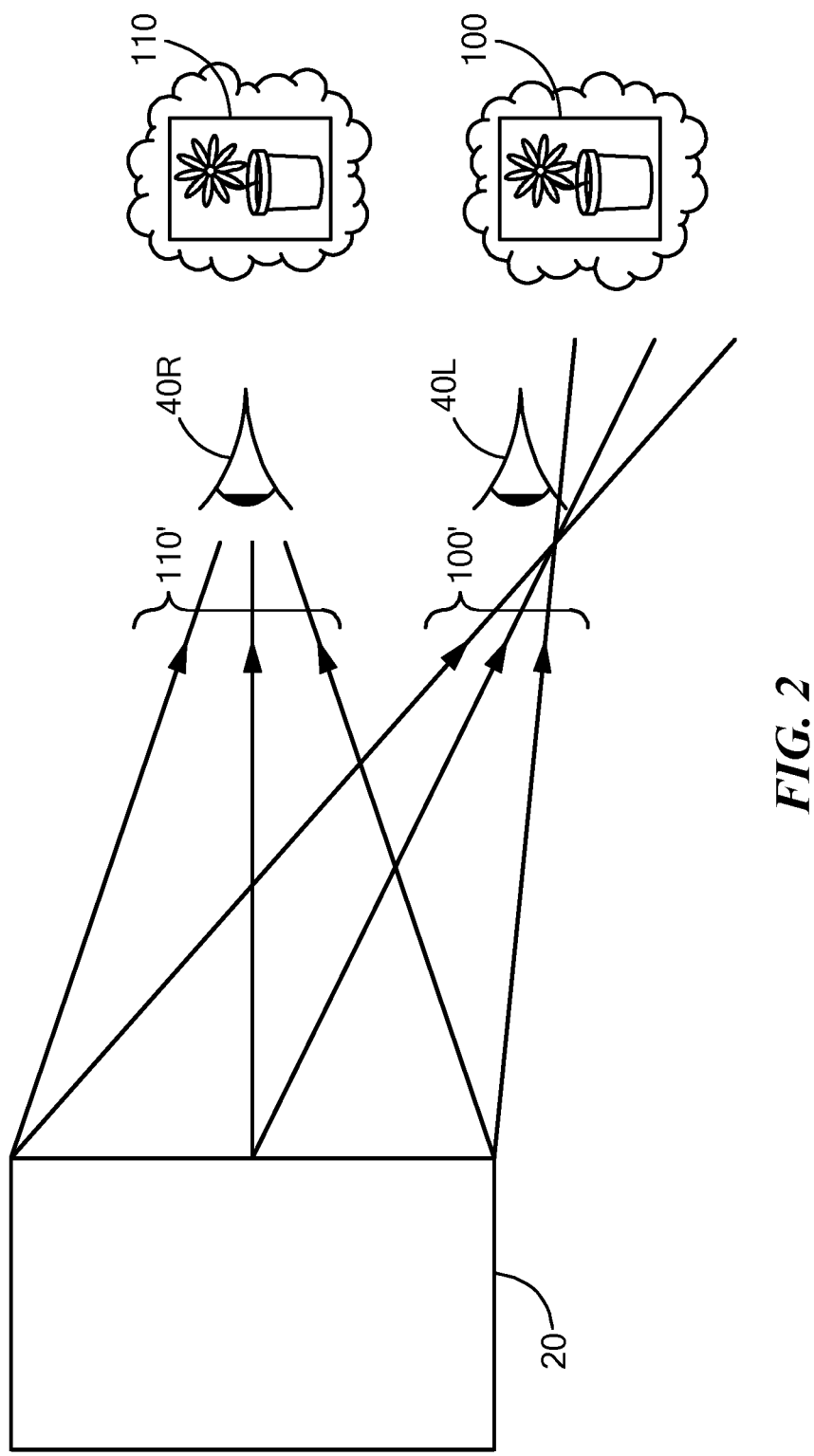

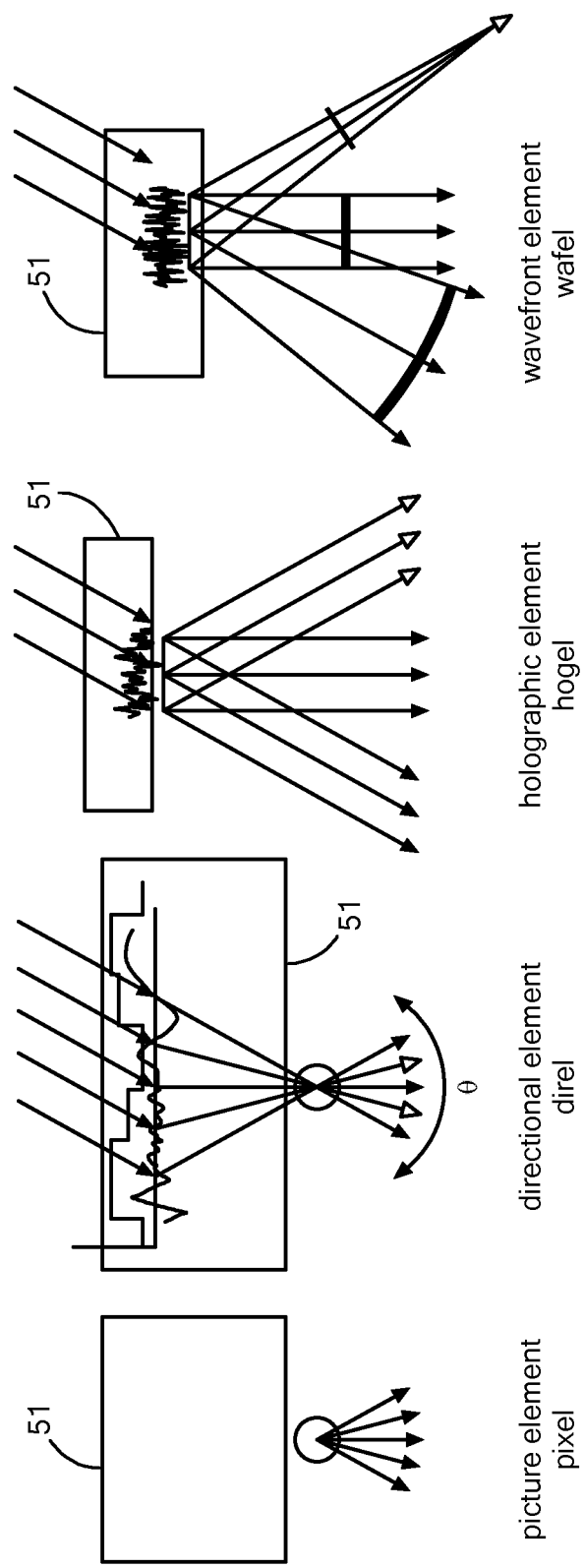

Passive (steer by wavelength)

METHOD AND APPARATUS FOR LIGHT FIELD GENERATION

The present application claims the benefit of U.S. Provisional Patent Application No. 62/450,855, filed Jan. 26, 2017, titled "Method and Apparatus for Light Field Generation," the entire contents of which are hereby incorporated by reference, for all purposes.

TECHNICAL FIELD

The present invention relates to the use of an optical array of antennas, and more particularly to nanophotonic antennas in a phased array associated with a phase shifter, as a light field generator for such uses that include 3-D display and beam scanning for electronic display among others.

BACKGROUND ART

Autostereoscopic 3-D displays generate imagery visible to the unaided eye. The specific characteristics of the imagery depend on the operational mechanisms of the display device, but their properties usually include: (1) appearance in front of, behind, or straddling the display, (2) visibility as three-dimensional within a range of angles or distances from the display, (3) having a perceived spatial resolution, often specified at a surface of greatest detail (e.g. the display surface if one exists), (4) responsiveness to time-varying input, e.g. capable of displaying dynamic rather than static imagery, and (5) for imagery comprised of discrete perspective views, an angular view density which, ideally, is chosen so that the reconstructed 3-D scene does not exhibit visible "jumping" from view to view during user head motion.

For context, a typical 3-D display system performs the steps of:

(a) capturing or rendering information representative of a 3-D scene and storing it in a memory subsystem as image data;

(b) providing subsets of the image data to a projection engine of the display; and (c) optically presenting the image data as to project a 3-D image (known as reconstruction or replay).

Examples of typical 3-D displays, and approaches for performing (a) and (b), are detailed in the following references:

Halle, "Autostereoscopic displays and computer graphics," *SIGGRAPH Comput. Graph.*, pp. 58-62 (May, 1997);
Holliman, et al., "*Three-Dimensional Displays: A Review and Applications Analysis,*" *IEEE Trans. Broadcasting*, pp. 362-71 (2011);
Chun, et al., "*Spatial 3D Infrastructure: display-independent software framework, high-speed rendering electronics, and several new displays,*" in SPIE Stereoscopic Displays and Virtual Reality Systems XII, (ed. Woods et al.), *Proc. SPIE-IS&T Electronic Imaging, SPIE*, vol. 5664, pp. 302-312 (2005); and
J. Geng, "*Three-dimensional display technologies,*" *Adv. Opt. Photon.*, vol. 5, pp. 456-535, (2013); and
Lucente, "*Computational holographic bandwidth compression,*" *IBM Systems Journal*, vol. 35, pp. 349-65 (1996).
All of the foregoing references are incorporated herein by reference.

Creating 3-D imagery by projecting an image sequence synchronized to the oscillatory motion of an opto-mechanical beam-steering device, such as the lenticulars described in U.S. Pat. No. 7,864,419, is noisy, difficult to construct at scales greater than 30 cm×30 cm, and have a limited field of view. U.S. Pat. No. 7,864,419, titled "Optical Scanning Assembly," (hereinafter "Cossairt '419"), is incorporated herein by reference. Moreover, these devices are difficult to operate in a two-axis (full parallax) scan mode because at least one mechanical axis must run at a very high frequency.

Creating static 2-D imagery in the far field has been demonstrated with a "pre-programmed" nanophotonic phased array using physically based interference modelling that requires the computation of potentially trillions of delay states to create an image of viewable size (See U.S. Pat. No. 8,988,754, and Sun, et al., "*Large-scale nanophotonic phased array,*" *Nature*, vol. 493, pp. 195-99, (2013), the entire content of each of which is hereby incorporated by reference herein for all that it discloses). However, the generation of dynamic (video) imagery using the Gerchberg-Saxton algorithm as reported is computationally expensive and requires orders of magnitude more delay-line controllers than the invention described here.

No electro-holographic or diffractive display of practical utility at a variety of scales has yet been demonstrated in the prior art. One reason for this is that the optical modulator is either too slow, or has pixels that are too large compared to the wavelength of light (resulting in imagery that either restricts head motion or requires a large output lens), or is run in a diffractive mode other than phased-array beam steering, which requires a complex scheme for asserting phase delays.

With rare exception, no autostereoscopic display technology has been of sufficient quality and utility to be widely adopted. Today's volumetric, lenticular, multi-projector, and scanned-view 3-D displays have been some combination of: unsuitably large for packaging into tablet or television form factors, uncomfortably narrow viewing angle, low image resolution at the display surface and throughout the reconstructed image volume, and computationally intensive.

Within the field of 3-D display, it is well known that 3-D imagery can be generated when light, representative of regions of a scene from a collection of viewpoints, is scanned in several directions towards a viewing region within the integration period of the human eye. This arrangement enables each eye of a viewer to potentially see a different image, which is a stereoscopic depth cue. For suitably broad fields of view, one or more simultaneous users can place their heads in different locations, inspecting a scene from various points of view.

Time-multiplexed autostereoscopic displays place demands on the frequency with which a set of light-transmitting regions must modulate, and on the number of such modulators. In one example, a 20,000 frame-per-second digital projector casts light onto a 30 cm×30 cm beam-steering array that performs oscillatory horizontal scanning at 50 Hz. In this case, the 3-D image is decomposed into 200 two-dimensional views, and the set of views are projected during each horizontal sweep of the scanner every $\frac{1}{100}$ sec ($\frac{1}{100}+\frac{1}{100}=\frac{1}{50}$ sec=50 Hz). Therefore, a 100×200=20,000 frame-per-second image source is required.

Workers in the field of 3-D display have experimented with various agile beam steering devices for 3-D display, such as two lenticular arrays undergoing relative vibratory motion, as described in Cossairt '419. Systems of this type have suffered from drawbacks including: narrow horizontal and/or vertical field of view, insufficient angular resolution, and acoustically noisy operation.

SUMMARY OF THE EMBODIMENTS

In accordance with an embodiment of the present invention, a radiation projector is provided that has a plurality of nanophotonic antennas configured to emit electromagnetic radiation. The radiation projector also has phase delay elements, each one characterized, at any particular moment, by a phase delay. At least one phase delay element is associated with at least one of the plurality of nanophotonic antennas. The radiation projector also has a control signal generator configured to generate a control signal associated with the plurality of delay elements, wherein the control signal is further configured to recurrently update phase delays of the plurality of phase delay elements in such a manner as to cause the electromagnetic radiation to substantially span at least one contiguous solid angle. In certain embodiments of the invention output of the antennas may generate a three dimensional light field of imagery.

A nanophotonic phased array can be configured to generate dynamic three-dimensional imagery in an efficient manner when employed as an oscillatory beam-steering device. A scanning nanophotonic phased array can generate programmable light fields. That is, a phased array can generate reconfigurable light fields if it is controlled to perform an angular scan of in-coupled or incident illumination and is synchronized with respect to the modulation of the incident illumination. This will be explained in the context of 3-D display. The system may use an optical array of antennas, configured as an array of nanophotonic antennas, to generate arbitrary light fields in applications including 3-D display. The array of nanophotonic antennas are assembled in an array of arrays, and operated in a phased array configuration to perform beam-scanning for electronic display.

Other techniques of electro-holographic display that may be applied to nanophotonic antenna arrays to generate 3-D imagery are also disclosed. For example, in addition to using the antennas as directional elements (direls) that perform a horizontal or two-axis periodic sweep of space, the antennas of the nanophotonic array can be operated as holographic pixels (hogels), each projecting an illumination cone representative of the appearance of a scene from a collection of viewing angles. Additionally, the nanophotonic phased array can be operated to produce "wafels," by imposing a desired curvature on each piecewise contribution of a reconstructed light field's wavefront.

In other embodiments of the invention, a MEMS phase shifter is used for shifting the phase of the illuminated signal to direct the electromagnetic radiation to the proper antenna at the proper angle.

The radiation projector may also include a modulator for receiving data representative of a three dimensional scene and producing a plurality of time-varying illumination patterns. In certain embodiments, the scene may be scanned from several different directions and projected in several different directions so that a view can move their head and look around the scene.

In accordance with other embodiments of the invention, the electromagnetic radiation emitted by the antennas may be visible light. The radiation projector may also include the plurality of nanophotonic antennas coupled to the modulator for dividing the time-varying illumination patterns into a plurality of paths, wherein a path is associated with each antenna within the array.

In other embodiments of the invention, the plurality of delay elements are a plurality of phase shifters each associated with an antenna for shifting the phase of the time-varying illumination patterns collectively so that the patterns are modulated in synchrony for each of several directions.

The phase delay elements may shift the phase in both a horizontal and a vertical direction. The phase shifters may be associated with an array of nanophotonic antennas that represent a single pixel and the phase shifters for the single pixel receive a phase control signal in the x direction and in they direction. In such a configuration only two phase shift control values are needed to steer a radiation pattern from the antennas in the array.

When the nanophotonic array is arranged in an array of arrays, each array can represent a single pixel. In addition to representing a pixel the radiation pattern may represent a hogel, a direl, or a wafel.

The radiation projector according may also include a controller for providing phase shift control signals to each of the phase delay elements to provide a sequence of video images.

In certain embodiments of the invention, the plurality of phase delay elements is a MEMS phase shifter that mechanically alters phase based upon movement of a phase actuator. The phase actuator may be a movable membrane.

The radiation projector may also include a database containing data representative of the three dimensional scene scanned from several different directions.

In accordance with further embodiments of the invention, the nanophotonic antennas may be controlled with a first control signal to steer the emitted output radiation in a first direction. In other embodiments of the invention the nanophotonic antennas are controlled with a second control signal to steer the emitted output radiation in a second direction. The plurality of nanophotonic antennas may be arranged in an array and the array may be arranged on a two dimensional surface.

In another embodiment of the invention the radiation projector includes a lens and a plurality of interconnected switches having an input and an output wherein the input receives a time-varying illumination pattern and the time-varying illumination pattern is synchronized with control signals to the plurality of switches allowing the time-varying pattern to be directed in a desired direction through the output of the switches and through the lens. In certain embodiments the plurality of interconnected switches have a plurality of outputs that defines a pixel, wherein the direction of the emitted time-varying illumination pattern is dependent on the state of the switches.

In yet another embodiment of the invention for a radiation projector, the radiation projector includes a lenticular lens, an input for receiving a time-varying illumination pattern, a nanophotonic array having a plurality of outputs and a filter for directing the time-varying illumination pattern to a particular output of the nanophotonic array so that the time-varying illumination from the output is directed to the lenticular lens.

In accordance with other aspects of the present invention, methods are provided for generating a three-dimensional radiation pattern. The methods have steps of:
 receiving data from a data store that defines a three dimensional image;
 converting the data into a time-varying illumination pattern and providing the time-varying illumination pattern to an input of a nanophotonic array, wherein the nanophotonic array includes a plurality of antennas and the antennas emit electromagnetic radiation; and
 delaying the electromagnetic radiation with a plurality of phase delay elements using a control signal, at least one phase delay element associated with at least one of the plurality of antennas, wherein the control signal is periodic.

Corresponding methods are provided, in accordance with further embodiments of the invention, wherein the electromagnetic radiation is switched with a plurality of switching elements using a control signal, at least one switching element associated with at least one of the plurality of antennas.

In yet another embodiment of the invention, for a radiation projector, the radiation projector steers a phased array by changing the wavelength of the input signal. For example, a radiation projector includes a plurality of optical couplers, each optical coupler transmitting a first portion of a lightwave incident thereupon and radiating a second portion of the lightwave, the lightwave characterized at any point by a wavelength-dependent phase. The radiation projector may also include a waveguide for transmitting the lightwave successively to a succession of the plurality of optical couplers in such a manner that the wavelength-dependent phase varies between successive optical couplers by a fixed wavelength-dependent increment.

BRIEF DESCRIPTION OF THE DRAWINGS

The foregoing features of embodiments will be more readily understood by reference to the following detailed description, taken with reference to the accompanying drawings, in which:

FIG. 2 illustrates a top view of the 3-D display system in operation;

FIGS. 4A-4D shows different patterns that may be generated by a tile (nanophotonic phased array with a plurality of phase delay elements) wherein each tile is analogous to a pixel in 2-D display and any of: "hogel," (FIG. 4B) "direl," (FIG. 4C) "wafel," (FIG. 4D) may also be produced by the tile;

FIG. 15 shows an embodiment of the invention in which active steering is performed by phase shifters/modulators, and FIG. 16A shows an embodiment of the invention that includes passive beam steering where the beam is steered according to wavelength. FIG. 16B shows an exemplary tile in which the light follows the serpentine path as shown in FIG. 16A, in accordance with an embodiment of the present invention.

DETAILED DESCRIPTION OF SPECIFIC EMBODIMENTS

Figure 1:
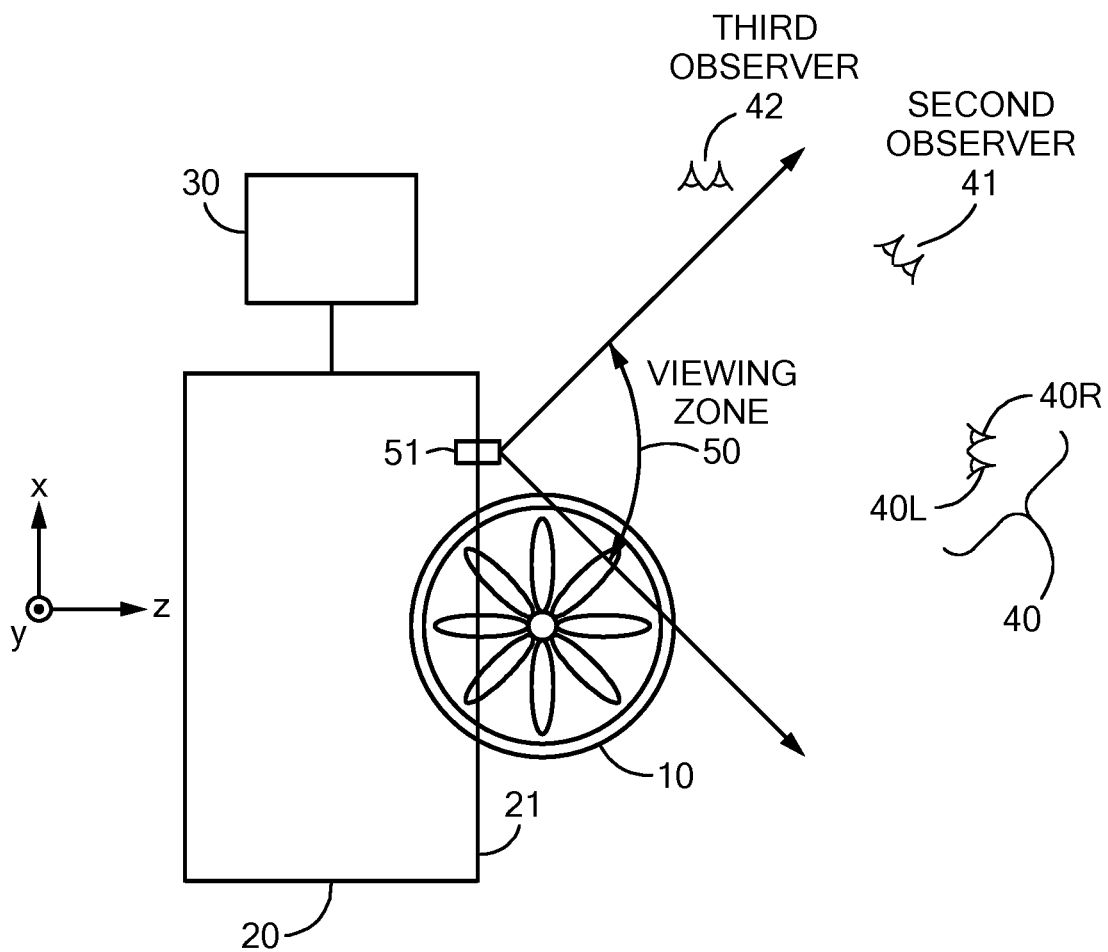
FIG. 1 is an exemplary system illustrating the reconstruction of a 3-D scene by a 3-D display system.

Embodiments of the invention solve the problems of the prior art by utilizing nanophotonic phased array "tiles," assembled into tile groups of arbitrary size, in a variety of periodic or aperiodic beam-steering modes, while input illumination is modulated in synchrony with each tile's beam direction and the corresponding elements of a database or memory representative of a visual scene to be reconstructed.

Definitions

The word "arbitrary," is used herein to refer to a value of a parameter (such as the size of a component) that may be specified by a designer of a system as a matter of design choice, or that is presented by the system to be elected by a user, as a matter of convenience.

A "modal index," as the term is used herein, refers, as normative in the art, to the effective refractive index of a waveguide medium particularized to a specified mode of propagation in the medium.

A control signal generator includes any circuitry, known in the art or subsequently developed, that applies a control signal to a succession of control elements, whether in parallel, in whole or in part, or successively, or in some combination of parallel and serial application. The control signal generator may be implemented in whole, or in part, in analog or digital embodiments.

"Recurrently" means beginning at successive instants of time, and may include periodic behavior, but is not so limited, as it may include patterns that are not identical from sweep to sweep, and that may, in fact, be random or quasi-random.

"Update a phase delay" means to apply a control signal to each of the successive phase delay elements. Updating a phase delay may include moving the control signal to successive sets of phase delay elements.

"Substantially span" means encompassing a region (of solid angle, for example) so that it is perceived by the eye as covering that region.

With the appropriate synchronization of scanning and amplitude modulation, users will perceive imagery due to the persistence of vision over the period of the system's scanning action.

An additional embodiment of the invention employs MEMS phase shifters in place of other phase delay elements. The MEMS phase shifters employ mechanical principles for shifting the phase of the optical signal. One such embodiment, includes a moveable structure that physically interacts with the waveguide to change the optical path and thus, the phase of the optical signal. In another embodiment, a membrane is moved closer or further away from the waveguide altering the evanescent fields that extend from the waveguide and changing the modal index of the waveguide system.

Another embodiment of the invention uses an antenna array to create 3-D images, for example in analogy to lenticular arrays and integral photography.

This method has several benefits over other scanned-viewpoint autostereoscopic displays, including: a thin form factor suitable for packaging into consumer electronic devices; the ability to be tiled with minimally-visible seams between tiles; having a high spatial resolution at the display surface; and compatibility with semiconductor laser illumination offers high switching speeds between views, thereby permitting several views per pupil area. This elicits an accommodative response (i.e., refocusing) in the viewer due to the realistic projected imagery.

Embodiments of the invention are also directed to using an optical array of nanophotonic antennas (or an array of arrays) to generate arbitrary light fields in applications including 3-D displays. Embodiments of the invention are useful generally for projecting light fields. Light fields have applications in three-dimensional displays with or without optical headgear for the viewer, such that the images can be projected in free space. Embodiments of the inventive system may provide optical activation of biological tissue, such as optogenetics and neurogenetics. In such embodiments, because of the small scale of the arrays, the optical signal (i.e. light) can be directed to a plurality of neurons, so that multiple neurons can be activated simultaneously. In other embodiments, the nanophotonic arrays can be used for free-space communications, for projecting a beam and steering the beam, wherein 1 and 0 (or n-ary values) can be represented by different phases and the beam can be steered toward a receiver. For example, the optical beam may be steered toward a moving satellite. In another embodiment of the invention, the nanophotonic arrays may be used for perspective-correct optical cloaking. In such an embodiment, a vehicle, such as a tank, could be covered with nanophotonic arrays and the beamed imagery can change with the viewing angle. This would provide for a much more real presentation of camouflage, as the camouflage would change with the perspective of the aerial viewer. In yet another embodiment of the invention, methods in accordance with the invention may be used for 3-D printing in which the beam steered light can cause a printing material to harden.

The fact that embodiments of the present invention employ diffraction to define beam characteristics provides an unprecedented degree of light field reconstruction flexibility. It is essentially a dynamically addressable hologram. Each tile can be directed to run in a variety of modes that "dial in" the realism of the reconstructed scene (by default, as directional elements, which are piecewise approximators to spherical wave front sections).

Embodiments of the invention can be the optical engine of electro-holographic displays, such as: a desktop 3-D computer display, a head-worn near-eye virtual reality/augmented reality/mixed reality display, a virtual sand table, or the walls of a room creating immersive imagery. Applications of such displays include: battlefield visualization, interventional medical imaging for procedure planning and guidance, molecular visualization and entertainment. FIG. 1 shows an exemplary system illustrating the reconstruction of a 3-D scene (10) by a 3-D display system 20. The 3-D display system has an image projection surface (21) composed of emissive regions 51 having horizontal and vertical angular emissive extents, yielding a viewing zone 50. An observer (40, 41—represented by his/her eyes) is able to see the 3-D scene 10 processed by processor 30 when situated within the viewing zone 50. A viewer outside the viewing zone who is not gazing at the image projection surface, such as a third observer 42, will not see a 3-D image because light representative of the 3-D scene will not enter the pupils of the third observer. As noted, the display emits light such that each eye sees a potentially different image. The emissive regions output light with an intensity and direction (or other emissive profile, such as a curved wave front) with time-varying properties.

FIG. 2 illustrates a top view of the 3-D display system in operation. The observer (40) with left (40L) and right (40R) eyes will perceive a 3-D image when the image projection surface emits illumination representative of two perspective viewpoints of the 3-D scene (100, 110).

Figure 3A:
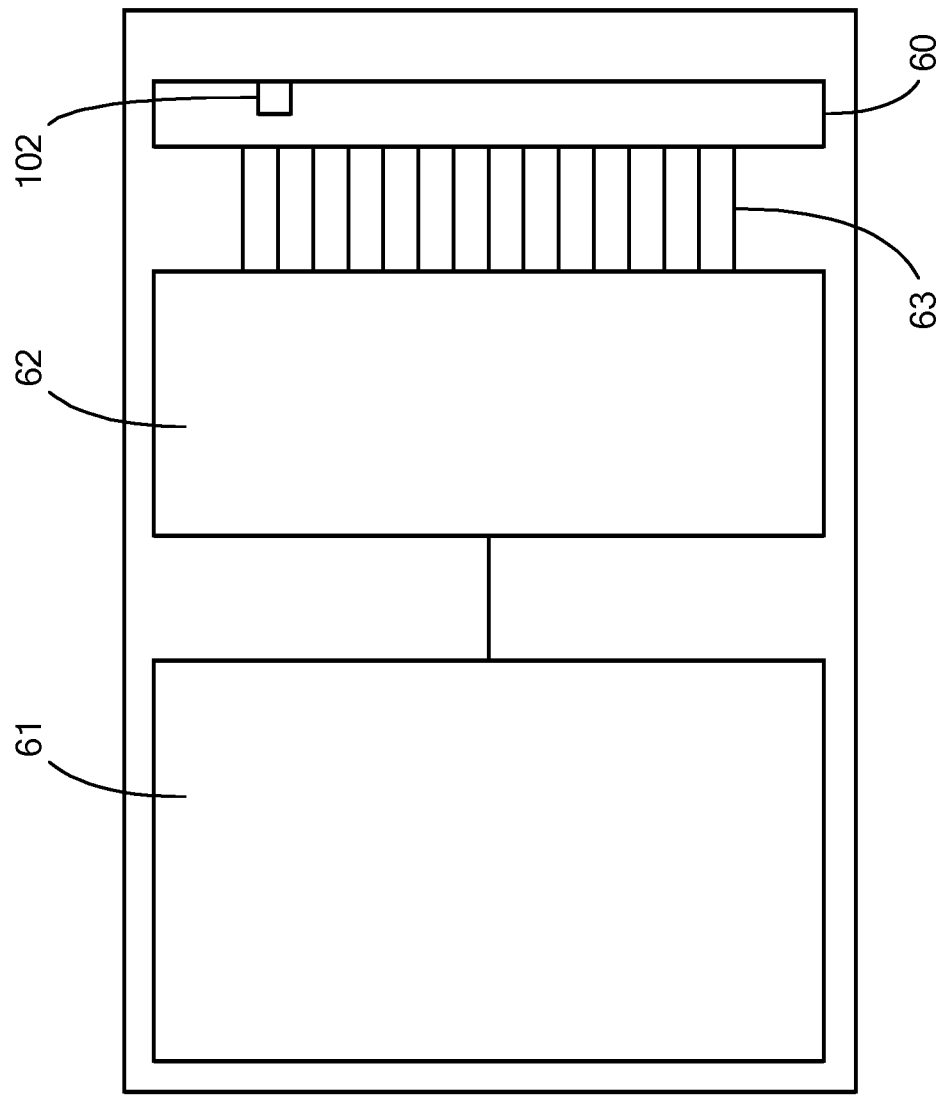
FIG. 3A illustrates a top view of a 3-D display system including each of the components of such a system.
Figure 3B:
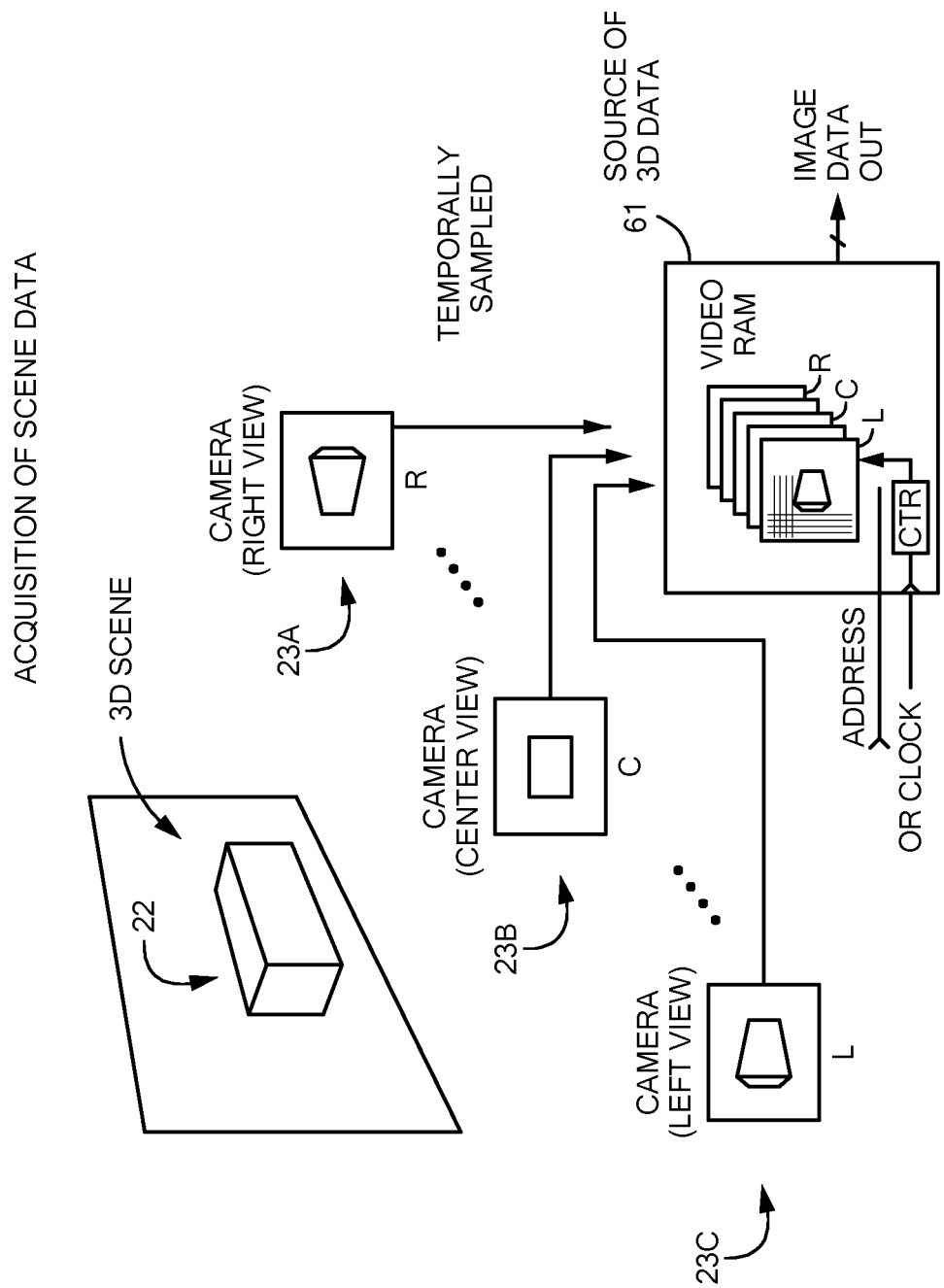
FIGS. 3B and 3C schematically depict acquisition and display, respectively, of scene data, in accordance with an embodiment of the present invention.

FIG. 3A illustrates a top view of a 3-D display system including each of the components of such a system. A source 61 of 3-D data such as a database or storage device (and otherwise referred to herein as memory 61) provides information representative of a 3-D scene to a display controller 62. The data stored in the storage device may be captured photographs from a 360-degree view of an object or the data may be three dimensional computer generated data. The photographs do not need to be a 360-degree view and might be just a small number (as in the range of 2°-100°) from different perspectives of a camera moving along a linear track. FIG. 3B shows the acquisition of 3D scene data, designated generally by numeral 22, for later presentation and viewing by an observer. Cameras 23A, 23B and 23C are positioned at different locations to capture scene 22. As shown, there is a left view camera 23A, a center view camera, and a right view camera that each captures an image simultaneously. This image data is passed through video processor and stored in memory 61 for later retrieval and is indexed with respect to time (i.e., relative to a clock signal CLK).

Figure 11:
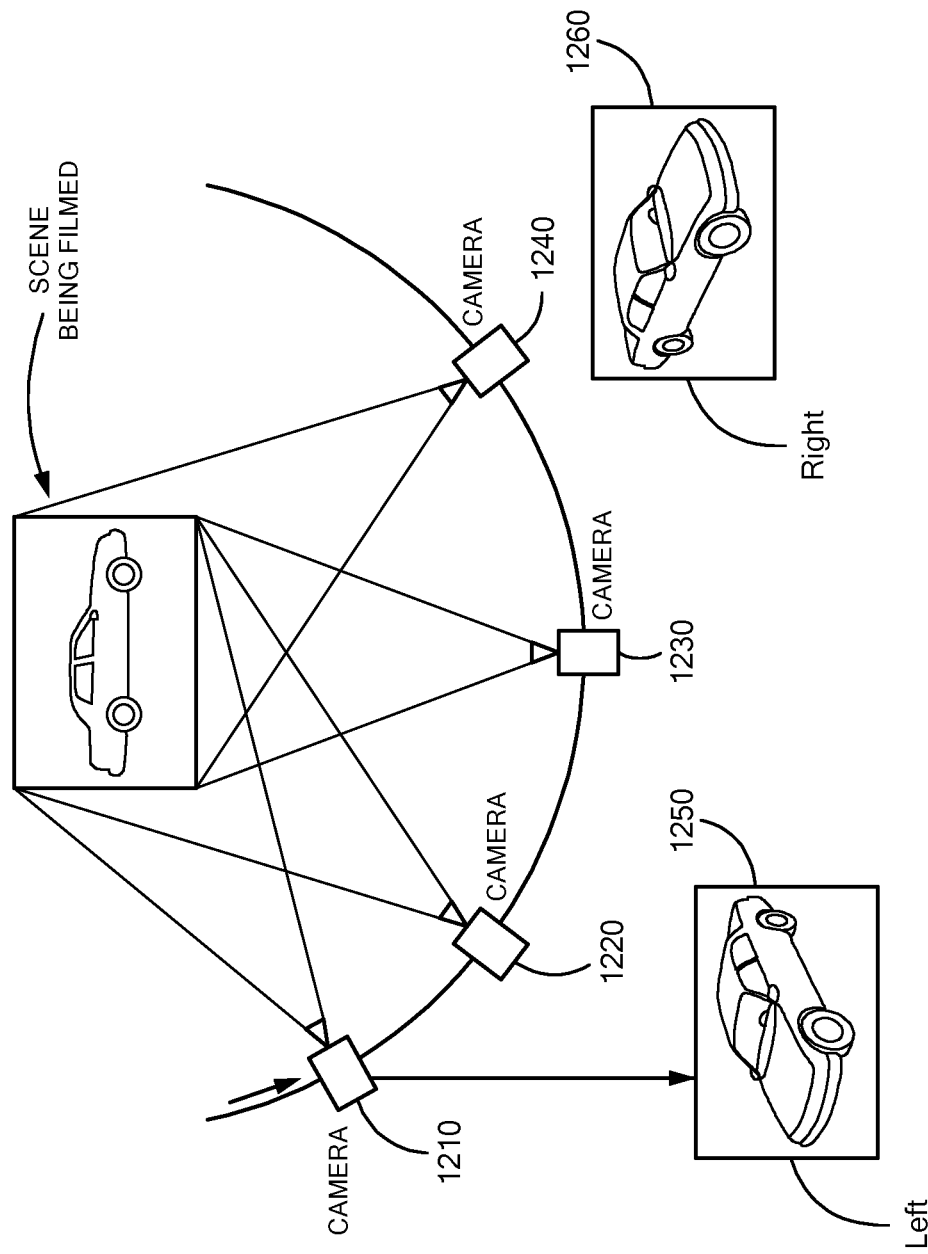
FIG. 11 is a representation of how the initial data is derived and stored in a storage space prior to be retrieved for display using the nanophotonic array embodiments.

FIG. 11 is a representation of how the initial data is derived and stored in a storage space prior to being retrieved for display using the nanophotonic array embodiments described in the present disclosure. As shown, a car 1200 is the desired scene to be projected by an embodiment of the present system. A movable camera or a series of stationary cameras take pictures of the car from different angles. These cameras can be real or synthetically generated cameras (i.e., for computer graphics). Each camera 1210, 1220 . . . 1230, 1240 captures a separate view of the flowerpot from a left-most view 1250 to a right-most view 1260. This data is then combined together to form a 3D data set using techniques known to one of ordinary skill in the art.

During display of the source data stored in memory 61, the display controller 62 provides time-varying illumination patterns along one or more connections 63 to a tiled array of phased arrays 60 and may also be referred to as a "modulator." Thus, the display controller 62 converts the three dimensional (3-D) data into the time varying illumination patterns.

One or more connective elements 63 (also referred to herein as "connections" 63) may be electro-magnetic or optical waveguides, for example, that separate the 3-D data scene into a plurality of lines, wherein each line may be associated with a separate pixel for display.

Figure 3C:
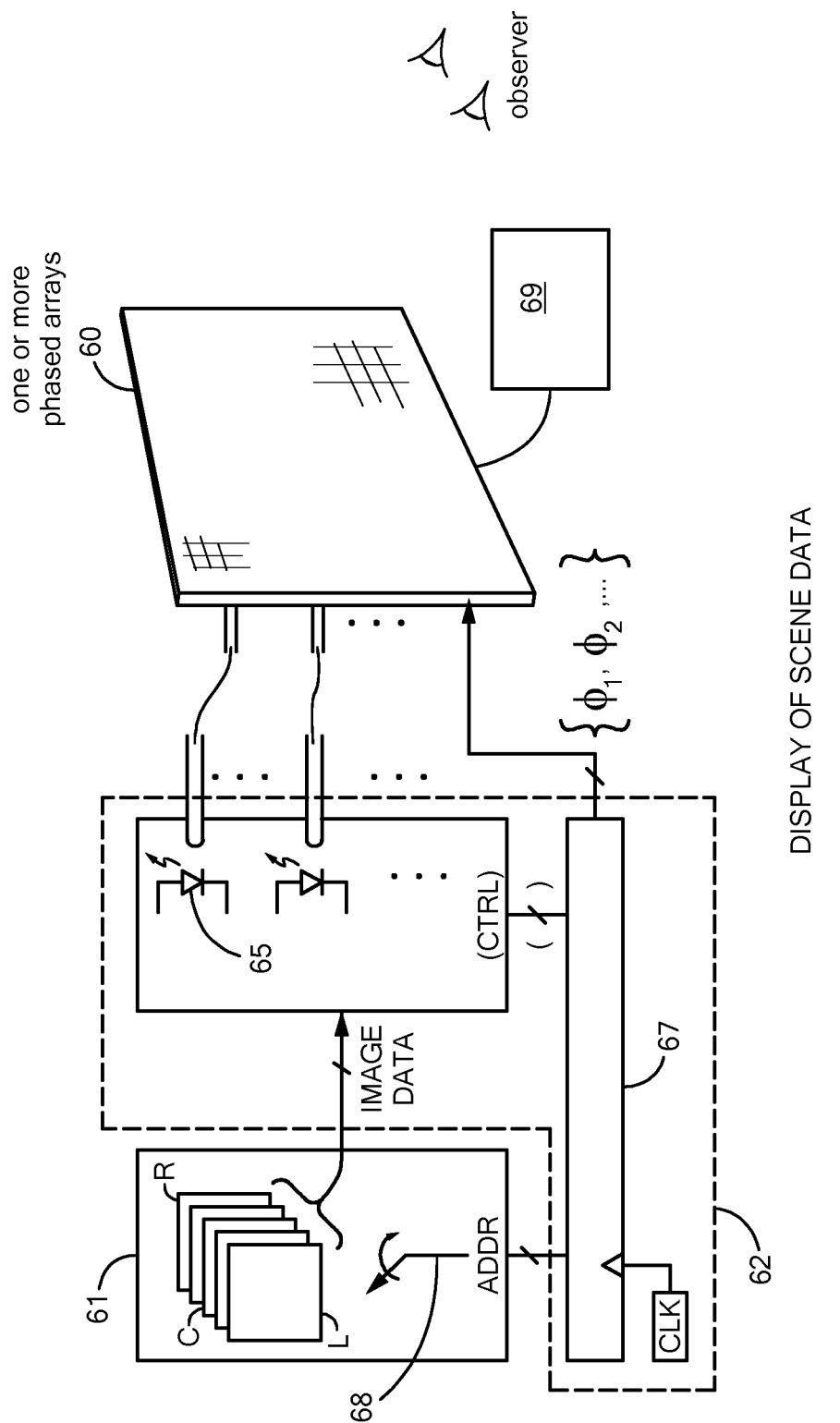

A single phased array 102 is illustrated in context. The design of the source 61 of 3-D data and the display controller 62 are well-known to practitioners in the art of 3-D display systems engineering. The display of scene data is shown in FIG. 3C. Display controller 62 includes an array of illuminators 65 (e.g., laser diodes coupled to fiber, otherwise referred to, for heuristic convenience, as laser diodes 65) and a controller block 67 that generically handles accepting an input clock signal, CLK. The controller block 67 cycles through video data address counter 68, and in synchrony with clock signal CLK provides the phase delays (e.g., $\phi_1$ and $\phi_2$), the address and optionally some control signals to the laser diodes. As the device is turned on, the address counter is set to "0" and $\phi_1$ and $\phi_2$ are set to the phases corresponding to steering light to the left. The image data of the left view arrives at the block of illuminators, and goes to the array of the phased array. Then the center and right views are also sent. This process cycles through for all of the data stored in memory. The time-varying emissive properties of each emissive region is controlled by a display controller 69. Display controller 69 provides control signals that include, but are not limited to: time-varying illumination intensity for each wavelength band(s) of each emissive region, and control regarding the diffractive function of each emissive region. In one example, the diffractive function of the emissive regions is a phased-array beam steering function.

In this first example, each emissive region is a phased array and is alternatively referred to as a "tile" 51. FIG. 4A-D shows different patterns that may be generated by a tile wherein each tile 51 is analogous to a pixel in 2-D display (FIG. 4A) vernacular and any of: "hogel," (FIG. 4B) "direl," (FIG. 4C) "wafel," (FIG. 4D) or other diffractive or beam-steering schemes in 3-D display vernacular. The terms hogel, direl, and wafel are familiar to engineers in the field of 3-D display architecture and are described, in addition to other arbitrary wavefront segmented displays, in Smithwick et al., "*Interactive holographic stereograms with accommodation cues,*" *Proc. SPIE* 7619, *Practical Holography XXIV: Materials and Applications,* 761903 (Feb. 10, 2010); doi: 10.1117/12.840526 and in Plesniak et al., "*Reconfigurable image surface holograms,*" U.S. Pat. No. 6,927,886, both of which are incorporated herein by reference in their entirety.

Figure 5:
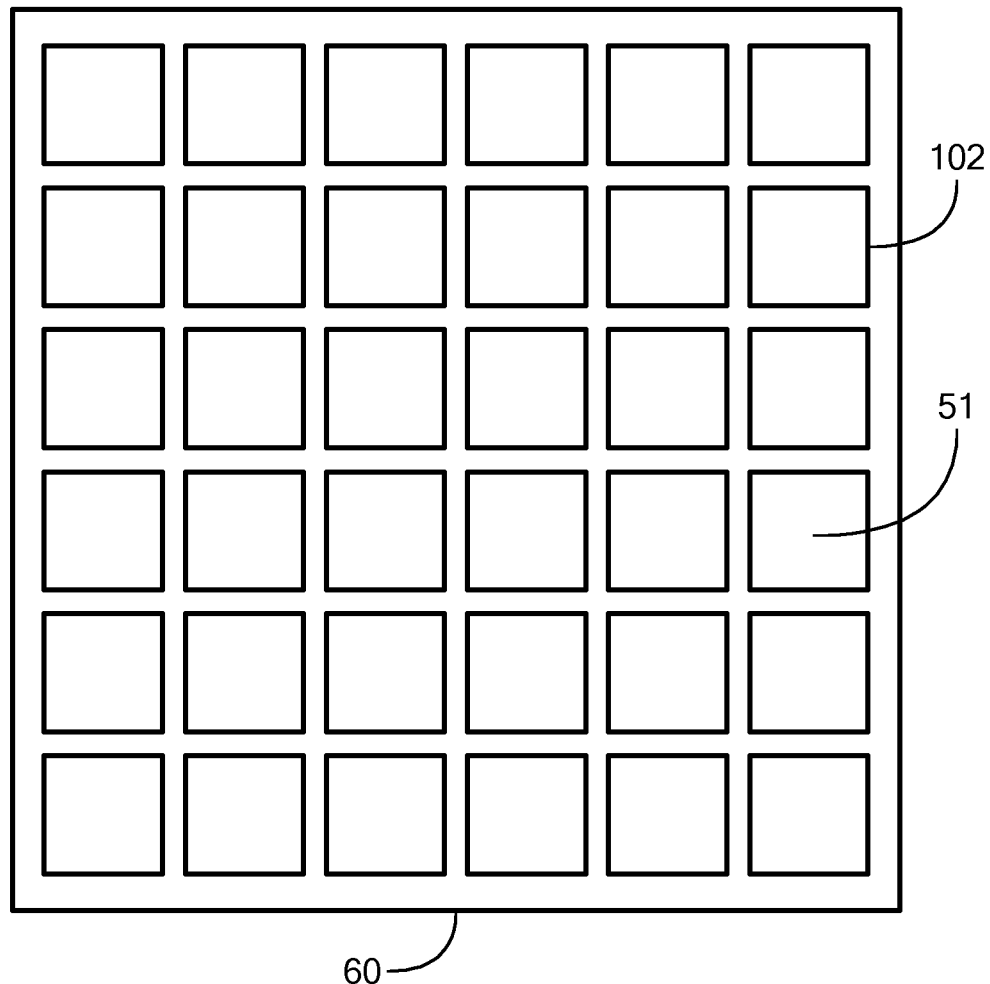
FIG. 5 shows an exemplary tiled array of phased arrays.

An exemplary tiled array 60 of phased arrays 102 is now described with reference to FIG. 5. Each tile 51 is an array of nanoantennas capable of being driven in a variety of space and time patterns, such as a phased array described above. Although a 6×6 tile array is shown for reference, the size, number, and arrangement of the tiles is determined as a matter of design choice to suit an intended application. For example, a desktop holographic video display may measure 600 mm×300 mm, and each tile would occupy 0.5 mm×0.5 mm. Each tile would direct modulated illumination in a time-varying angular scan subtending a half angle of 45 degrees horizontally to either side of the normal vector of the display, and a half angle of 20 degrees vertically. For a perspective projection angular density of one view per degree, the system would time-sequentially direct 2-D fields of modulated light to ((45*2)*(20*2))=3,600 directions per reconstructed scene, at a rate of 60 Hz. This requires a modulation frequency of 3,600 directions/scene*60 scenes/second=216,000 directions/second.

Operation in a horizontal parallax only (HPO) configuration reduces the scan requirements to (45*2)=90 directions per reconstructed scene, at a rate of 60 Hz, which equals 5,400 directions/second. To permit vertical head motion, the tiles must have a vertical emission component, e.g., by arrangement as a horizontally-oriented linear array; else the output should be vertically diffused, such as by an overlaid vertical diffuser, available from Luminit, LLC of Torrance, Calif., or by asserting a vertical beam broadening component to the appropriate delay lines of each tile.

Continuing the example of a display formed of 0.5 mm×0.5 mm tiles, there is a tradeoff between the image quality, tile size (phased array area), and spacing between nanoantennas. As one illustrative example, tile 51 could have an array of 100×100 antennas, with a spatial period of 500 nanometers. One-dimensional arrays would have 100 antennas. Tiles could have far fewer antennas, such as an array of 10×10, or far greater numbers of antennas, such as an array of 1,000×1,000 or 10,000×10,000. Likewise, the spatial period of antenna placement can vary from sub-wavelength to many wavelengths.

Figure 7:
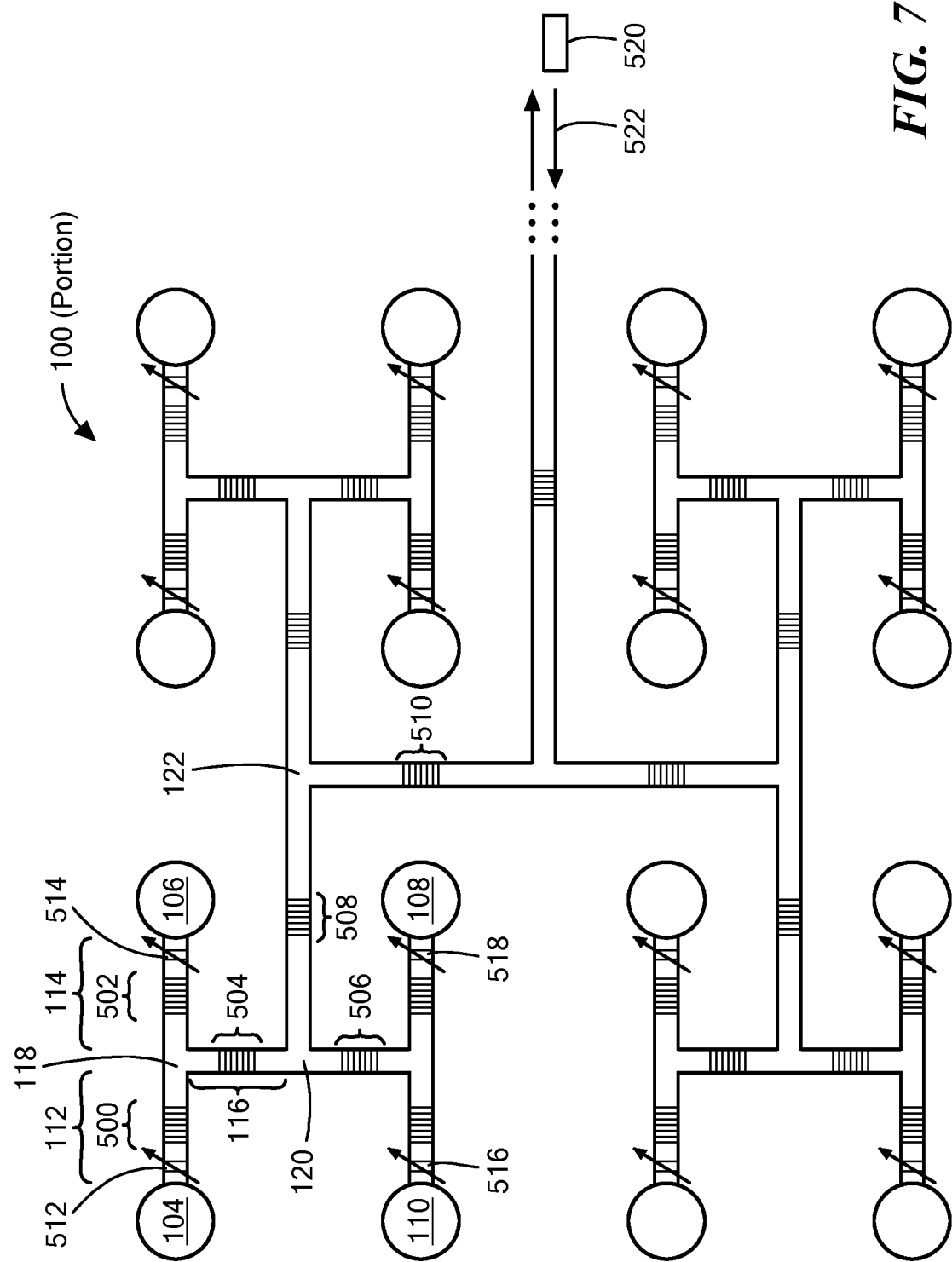
FIG. 7 is a schematic diagram plan view of a portion of the phased array.
Figure 8:
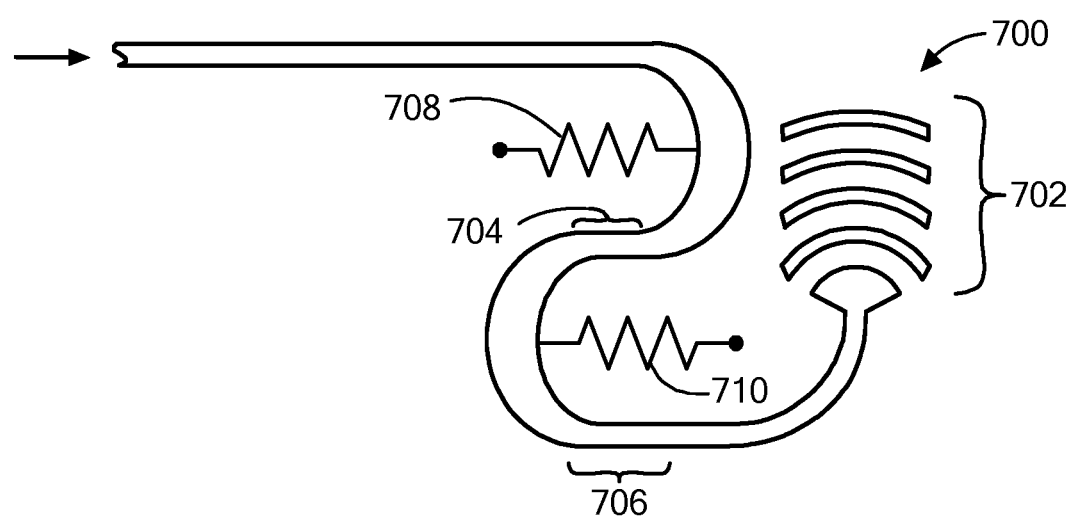
FIG. 8 is a schematic diagram plan view of a dynamically tunable optical delay line.

A typical tile 102 is described below with reference to FIG. 6. FIG. 7 provides additional detail of a typical tile, and FIG. 8 shows the antenna structure. A more comprehensive discussion of phased arrays can be found in US Published Patent Application No. 2016/0245895, entitled "Zero Optical Path Difference Phased Array," which is incorporated herein by reference in its entirety. Provided below is a brief description of the phased arrays and the individual components of phased arrays. This description should not be viewed as limiting, but rather as an exemplary description of one type of phased array.

Figure 6:
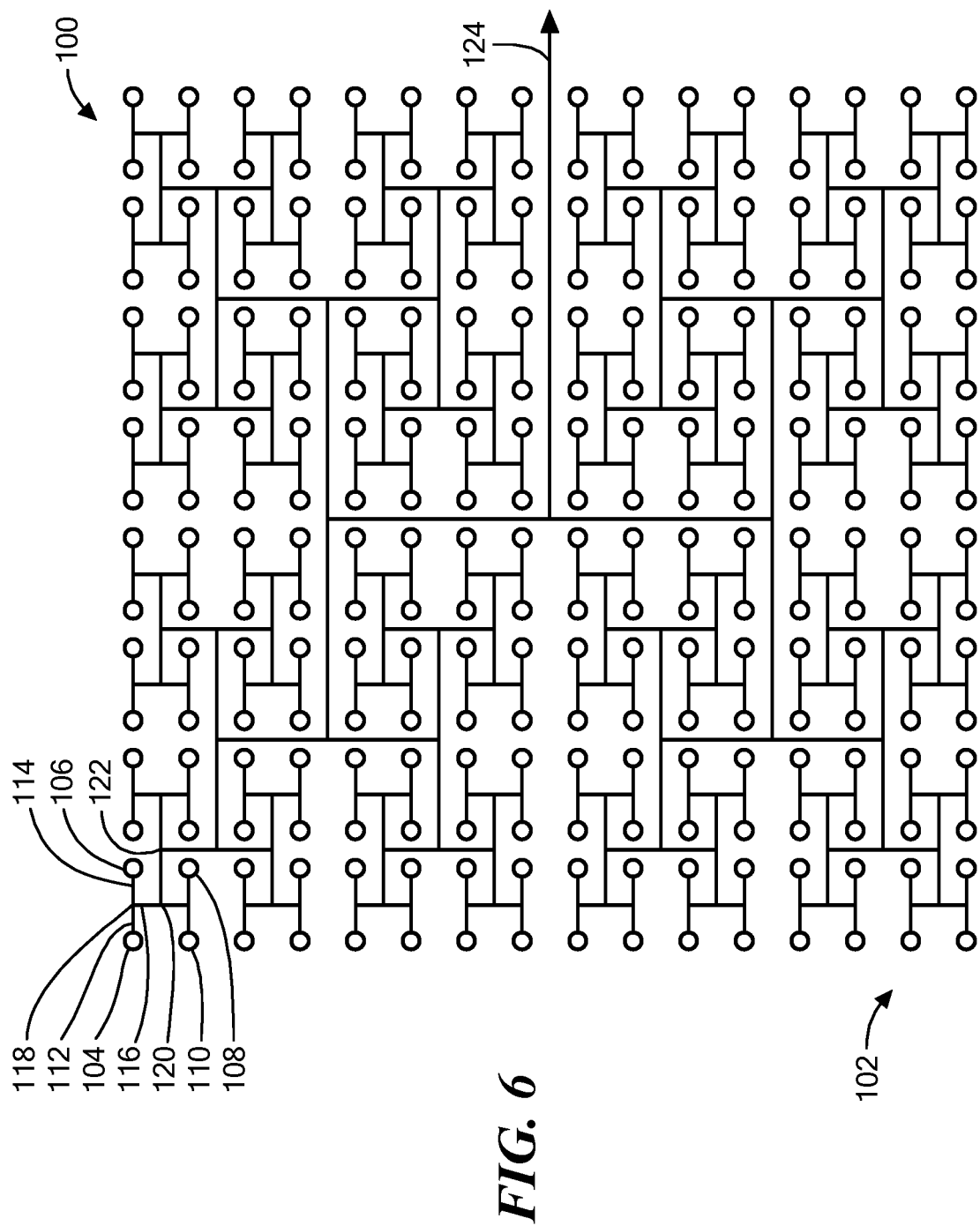
FIG. 6 is a schematic diagram plan view of a phased array 100 of optical couplers, represented by circles, arranged in an H-tree.

FIG. 6 is a schematic diagram plan view of a phased array 100 of optical couplers, represented by circles, arranged in an H-tree 102, according to an embodiment of the present invention. The optical couplers, exemplified by optical couplers 104, 106, 108 and 110, are connected to leaves of the H-tree 102. Each optical coupler 104 may be referred to herein as an "optical antenna." Lines in the H-tree, exemplified by lines 112, 114 and 116, represent optical waveguides or other optical feedlines. The optical waveguides 112-116 meet at optical splitters/combiners, represented by junctions 118, 120 and 122 of the lines 112-116. For example, the optical waveguides 112 and 114 connecting optical couplers 104 and 106 meet at an optical splitter/combiner 118.

Optical waveguides 112 and 114 are of equal lengths. Similarly, other pairs of optical waveguides 112-116 that meet at common junctions are of equal lengths. The direction of combination alternates (left-right, up-down) between successive optical splitters/combiners 118-122 to ensure each signal combination occurs in phase. The resulting phased array 100 operates over a broad range of wavelengths. The entire phased array 100 is fed by an optical waveguide 124, which is referred to herein as a "root" of the H-tree.

FIG. 7 is a schematic diagram plan view of a portion of the phased array 100. The optical waveguides 112, 114 and 116 include respective exemplary trimming portions 500, 502 and 504. The trimming portions 500 and 502 are disposed in the light paths of optical couplers 104 and 106 closer to the optical couplers 104 and 106 than any optical combiners/splitters 118 or 120. Additional trimming portions, such as trimming portions 504, 506, 508 and 510, may be disposed in other optical waveguides, further from the optical couplers 104 and 106.

The phased array 100 also includes a dynamically tunable optical delay line for each optical coupler 104-110, as exemplified by dynamically tunable optical delay lines 512, 514, 516 and 518. Each dynamically tunable optical delay line is disposed in a respective optical path of the corresponding optical coupler 104-110. FIG. 8 is a schematic diagram plan view of a dynamically tunable optical delay line 700 feeding a compact grating 702 optical coupler. Lengths of two sections 704 and 706 of the dynamically tunable optical delay line 700 may be temporarily adjusted by varying amounts of heat generated by two heaters 708 and 710 that are fabricated in the substrate 200. The amount of heat generated by each heater 708-710 may be controlled by a processor (not shown) executing instructions stored in a memory to perform processes that steer the phased array 100. Thus, each dynamically tunable optical delay line includes a thermally phase-tunable optical delay line. "Temporarily" means not permanently, i.e., for a finite duration of time, wherein the duration is not necessarily predetermined. For example, after the heaters 708 and 710 cease generating heat, the two sections 704 and 706 of the dynamically tunable optical delay line 700 return to their respective earlier lengths, or at least nearly so. It should be recognized that other tunable optical delay lines may be used that do not require heat for tuning, rather the delay may undergo phase shifting via a MEMS phase shifter as described below, for example.

Dynamically tuning the tunable optical delay lines 512-518 controls the real-time phase of each optical coupler 104-110 of the phased array 100. Dynamically tuning the tunable optical delay lines 512-518 makes temporary changes to the amount of delay incurred by optical signals traversing the corresponding optical coupler 104-110. The amount of delay can be changed relatively quickly, thus the dynamically tunable optical delay lines 512-518 may be dynamically tuned to electronically steer the phased array 100. Instead of, or in addition to, making permanent changes to the trimming sections, the trimming sections and/or the tunable optical delay lines 512-518 may be temporarily changed to compensate for fabrication non-idealities.

Figure 9:
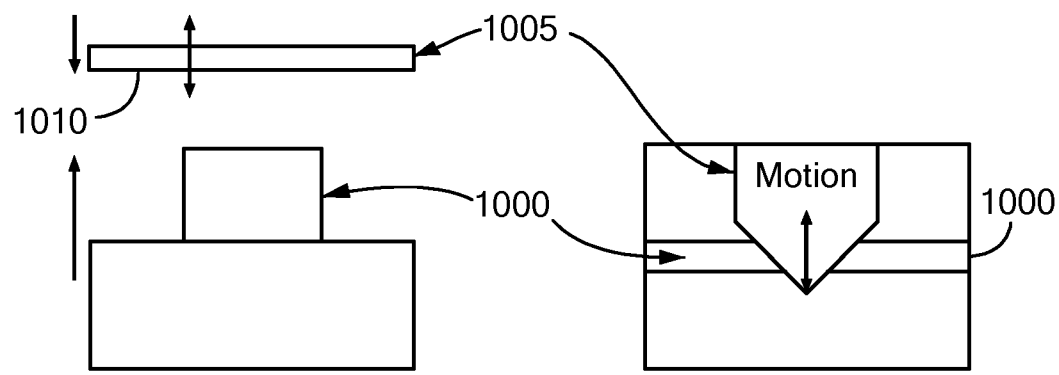
FIG. 9 shows a MEMS phase shifter.

An alternative way to control the phased array 100 uses MEMS phase shifters. A MEMS device can be used to affect a path length or a phase change in an optical waveguide. Such a MEMS device is shown in FIG. 9, where a membrane 1010 is moved closer or further from a waveguide 1000. Because the mode in the waveguide 1000 has evanescent fields extending to the membrane 1010, the movement of the membrane 1010 changes the modal index of the waveguide system. The MEMS element(s) can be moved along a variety of locations rather than just STATE A and STATE B, such that it is nearly infinitely adjustable.

Figure 10:
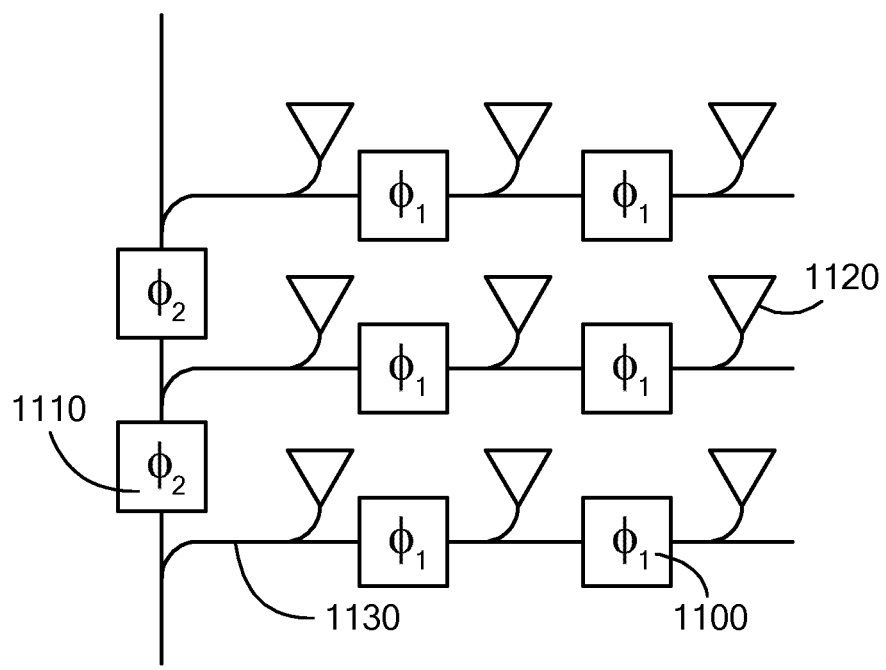
FIG. 10 shows an alternative embodiment wherein phase is controlled in a two-axis system for steering the beam.

Alternatively, as now described with reference to FIG. 10, a membrane 1005 (shown in FIG. 9) above waveguide 1130 can be moved laterally to cover more or less of the waveguide 1130. A two-axis steering mechanism is illustrated (for example, horizontal and vertical). To steer a single beam to an antenna structure 1120, only two categories of phase shift need to be asserted: $\Phi_1$ 1100 for horizontal scanning and $\Phi_2$ 1110 for vertical scanning. Alternatively, each phase could be set independently, providing a completely arbitrary phase hologram.

A further alternative (not shown) is to place a free-standing movable object laterally to the waveguide. This object, such as a wire-like object, is moved closer or further from the waveguide, again affecting the evanescent field extending (this time laterally) to the main waveguide.

The advantage of such MEMS systems is that they are compatible with a wide range of optical materials, enabling this technology to be used for a wide range of wavelengths extending from the mid-IR to UV (including the important visible wavelengths in-between).

If it is desired to operate the phased arrays in the visible spectrum, the appropriate materials should be used. The passive waveguides can be made of a variety of well-known materials, preferably silicon nitride, because of its compatibility with CMOS fabrication processes and high index contrast. Alternative materials for passive waveguides include doped silica or polymers. Active materials include GaN, AlN, and certain polymers. If desired, a blue/UV laser can be fabricated in GaN.

Continuing the description of the first example, as shown in FIGS. 1-3A-3C, the tiles act to reconstruct a 3-D scene in the following sequence. See the left side of FIG. 12. An array 1310 of light sources 1301 is controlled by the connections 63 (shown in FIG. 3A) to emit light representative of a first viewpoint 1302 of a 3-D scene, and the array of tiles are controlled so that their far field radiation patterns are tilted to an angle that corresponds to the first viewpoint 1302 of a 3-D scene. Next, the array of light sources are controlled to emit light representative of a second viewpoint 1303 of the 3-D scene, while the array of tiles are controlled so that their far field radiation patterns are tilted to the angle to the second viewpoint 1303, and so on. The techniques used to assert the scan angle e.g. within each tile, thermally controlled delay lines or phase shifters (e.g. MEMS phase shifters) assert the exit angle of each tile's outgoing light.

Several variations of the scheme taught here are now discussed, in the following categories: tiling geometries, scan directions, illumination, the diffractive function of each tile, and the "coherence" or "joint purpose" of display tiles.

Tiling Geometries

The display can be formed of tiles in a variety of arrangements: linear (1-D), meandering linear, non-abutting, abutting, surface (2-D), or other arrangements. (The word "areal" may be used herein adjectivally with a meaning synonymous with that of "surface.")

Scan Directions

Figure 12:
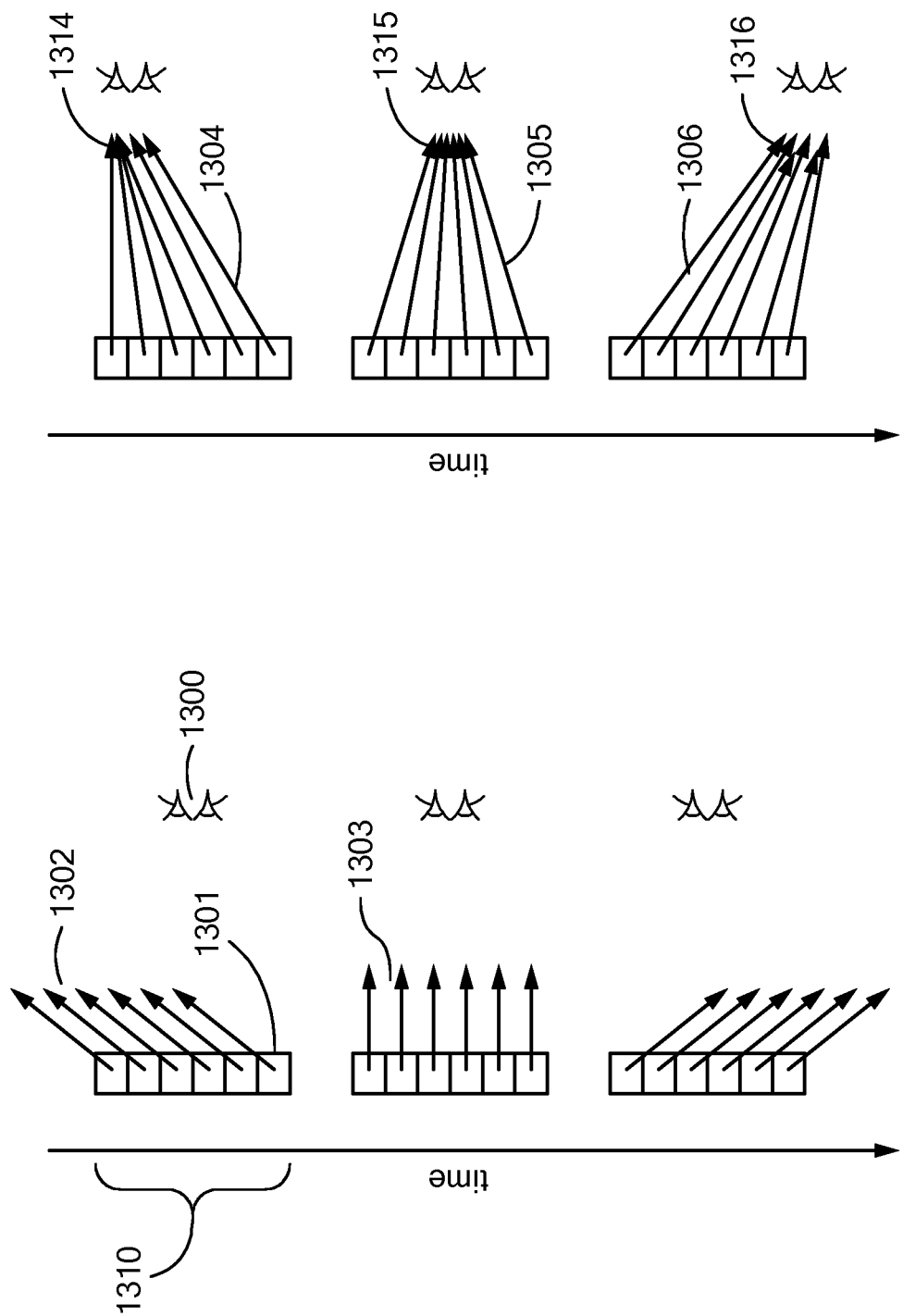
FIG. 12 represents the various directions that the outputs of a tile can be directed including both parallel directions and converging directions.

For example, tiles can steer light horizontally, vertically, in a 2-D raster scan, or in a random or pseudo-random pattern. Referring further to FIG. 12, at any specified instant, the phased array tiles can steer light in the same direction 1302, 1303, in different directions 1304-06, or in connected or disconnected groups. For example: The entire array can steer light at the same angle 1302, 1303, with respect to the line or surface of the tiles. The constituent beams of a 3-D scene can be derived from a variety of samplings through the data descriptive of the 4-D light field. For example, the first example described herein, as shown in FIG. 3A-3C, utilizes a scanned parallel pencil of rays. Alternatively, the array can steer light collectively towards a locus in space 1314, 1315, 1316, and move that locus during scan. (Compare, for example, the two scan patterns of FIG. 12).

As a further alternative, each tile can scan in a pseudo-random pattern. Regardless, if the display output is intended for viewing by a human, every desired scan angle should be projected by each tile over the integration period of the eye; Different tiles, or different collections of tiles, can steer light in one or more directions. For example: the left display half can perform a horizontal scan while the right display half can perform a vertical scan. Tiles can be arranged in arrays that are 1-D (linear, or a meandering line or curve), or a 2-D surface (a plane, a curved surface such as a concave hemisphere, or scattered/disconnected). The number of antennas per tile can be radically decreased to a linear array if the system is operating in a one-axis scanning mode. This would be the case for HPO (horizontal-parallax-only) 3-D display, in which the system emits a swept set of vertical ray fans.

Illumination

Light sources 65 (shown in FIG. 3C) such as lasers, LEDs, or any other suitable light source may be used within the scope of the present invention.

Alternatively, in accordance with embodiments of the present invention, imagery may be generated using techniques analogous to spatially-multiplexed autostereoscopic displays, e.g. lenticular array and integral photography (fly's eye lens array) display. In these approaches, each tile is associated with a lens positioned such that illumination from the sub-pixels of the tile is directed towards a given angle with respect to a normal of the tile. It should be recognized that a nanophotonic array may have several antennas producing light at the sub-pixel level. A benefit of this approach is that the sub-pixels can be made smaller, using nanophotonic antenna(s), than traditional LCD or OLED pixels, thereby resulting in higher quality imagery.

Figure 13:
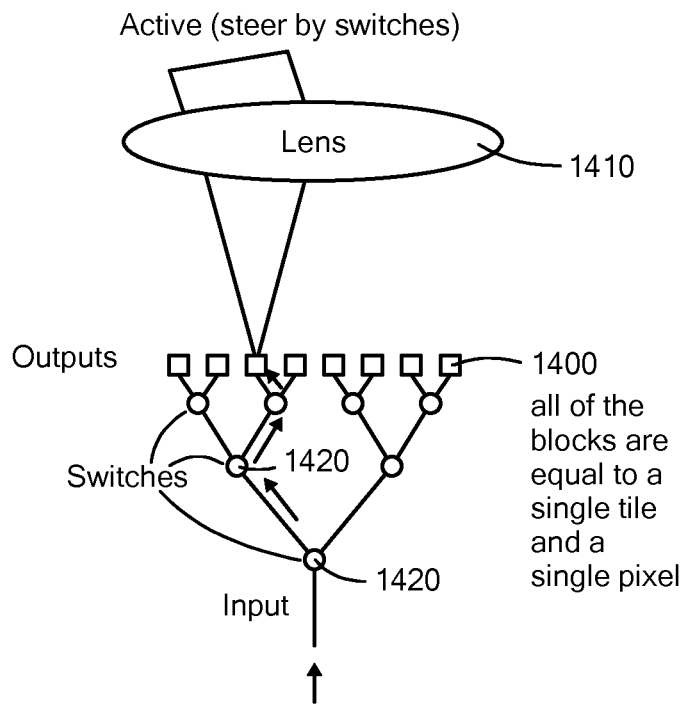
FIG. 13 illustrates a single tile of a display array, configured as an element of a spatially multiplexed display, using active steering by a network of switches.

Referring now to FIG. 13, a single tile 1400 of a display array is shown, configured as an element of a spatially multiplexed display, using active steering by a network of switches 1420. A series of switches 1420 direct incident light 1422 of an array of emitters toward a particular output 1425 of a nanophotonic array designated generally by numeral 1430. Larger displays can be constructed by adjoining many tiles into a surface, e.g., 1,024 tiles×768 tiles. A lenticular lens 1410 serves the function, in such an embodiment, of the phase shifters or phase delay lines of the previous examples.

Figure 14:
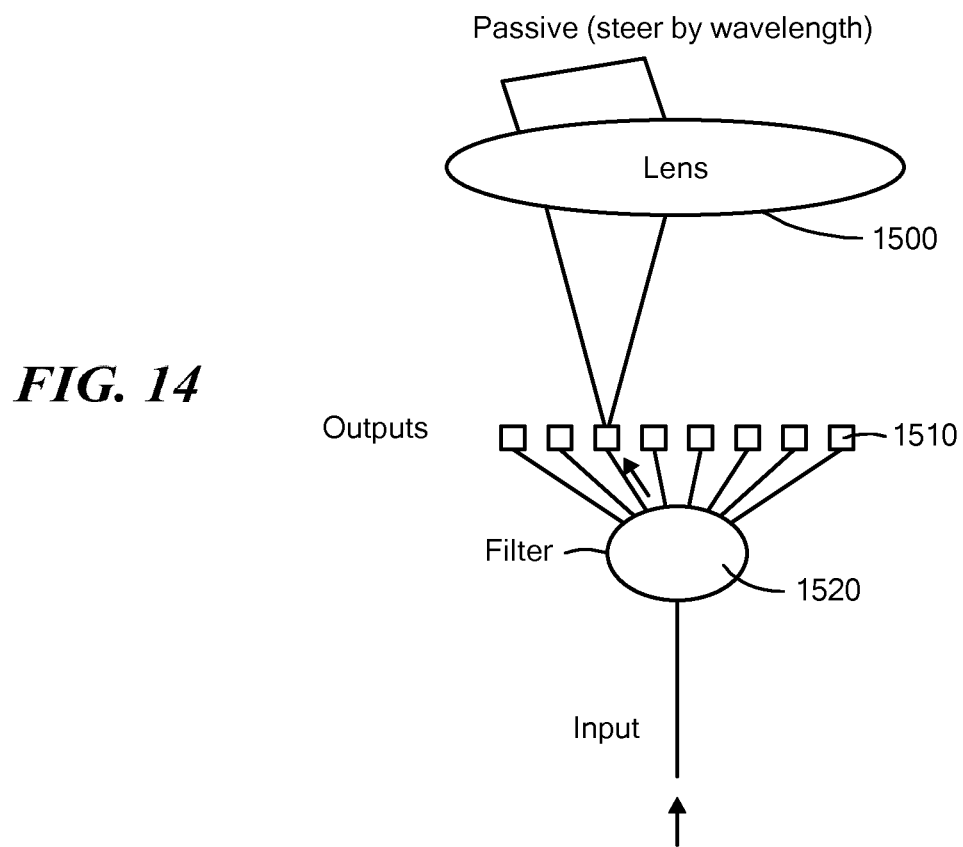
FIG. 14 illustrates an alternative steering technique that employs passive wavelength-selective switching, also as a tile of a spatially multiplexed display using a lenticular lens.

FIG. 14 illustrates an alternative steering technique that employs passive wavelength-selective switching, also as a tile 1510 of a spatially multiplexed display using a lenticular lens 1500. First, a laser is set to a first wavelength. Then data is fetched corresponding to the first view direction for the scene to be displayed by the display controller. The light is gated into the filter, based on the value in the frame buffer for that sub-hologram (e.g., if the pixel is to be perceived of as bright, the laser light should be allowed to pass into the filter). Next, the wavelength of the laser is incremented. A pointer to the data from the scene is also incremented and the process is looped for each data point.

In this technique, the beam direction depends on the wavelength of light as produced by the display controller. A wavelength filter 1520 directs the light to a particular output, depending on the wavelength of the light. In this case, the illumination wavelength would be changed to scan the beam using the display controller, and the light would be relatively narrowband, such as that from an external cavity or other tunable laser. Within the scope of the present invention, the colors may be close together, relative to the ability or inability of a human observer to discriminate their relative hues. The light wavelengths are each provided to a different pixel or subpixel location within the nanophotonic array of tiles 1510 and the light beam is directed at a normal angle from the tile wherein the lenticular nature of the lens causes the light beam to be directed in the desired direction.

Figure 15:
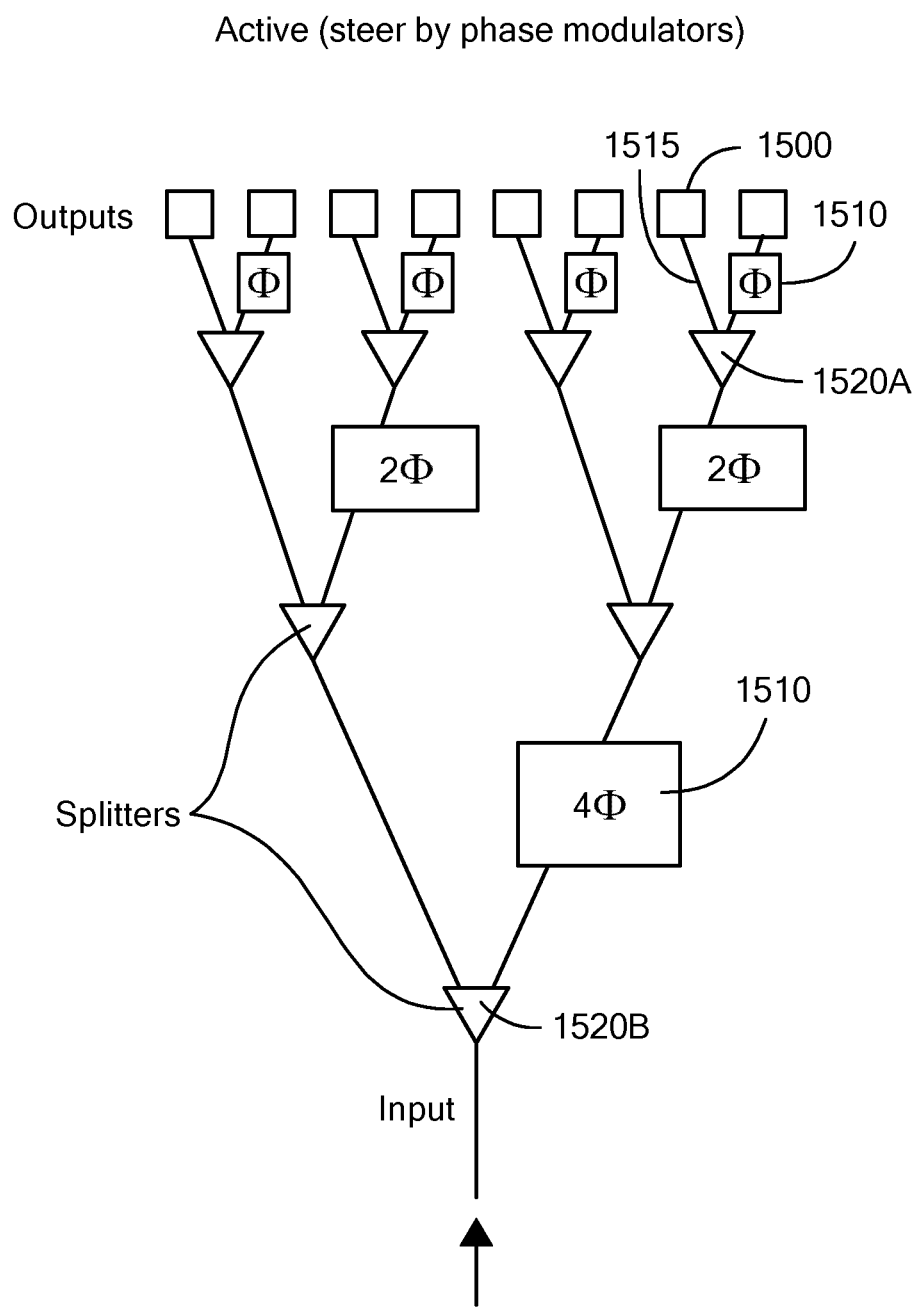
FIGS. 15 and 16A-16B show methods based on nanophotonic phased arrays to steer the light in each tile.
Figure 16A:
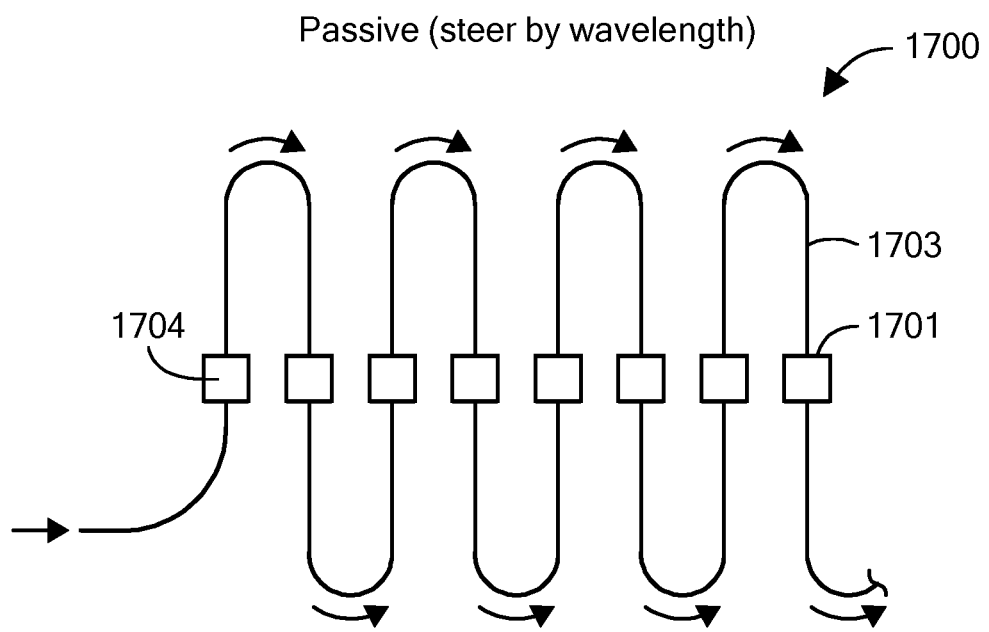
Figure 16B:
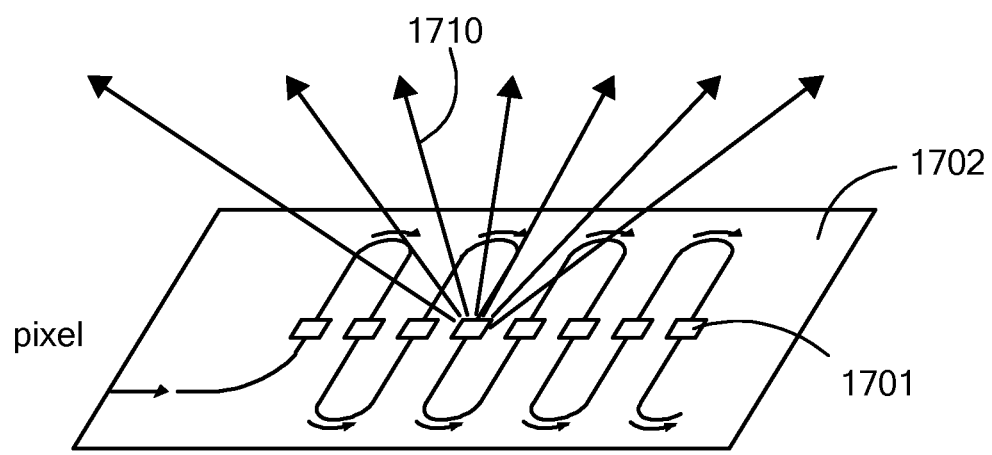

Methods are now described with reference to FIG. 15 and FIGS. 16A-16B that employ nanophotonic phased arrays to steer the light in each tile 1500. In the phased array systems, the beam is formed by a combination of light from an array of outputs of the tile 1500 (i.e., the tile is composed of a nanophotonic array that has multiple outputs), all of which are active at once. A relative phase difference between neighboring emitters determines the direction of the beam. For example, if the relative phase difference is zero (all phases equal), the beam is directed straight up with respect to FIG. 15. To direct the beam, a constant phase difference is needed between successive elements. FIG. 15 shows a distribution tree with phase shifters (1510 and 1515) (here illustrated in a binary fashion) which can impart such a phase shift to each element through splitter 1520A. Of the many arrangements to distribute power and such phase shifts, this arrangement has various advantages. One advantage is that only one control signal is necessary for all the phase shift devices because there is a constant relationship between all the phase shifts (all phase shifts are multiples of a single input, Φ.) A second advantage is that it is possible to use this technique for relatively broadband light, such as that from an LED, because all path lengths are matched.

A passive method for phase array steering is now described with reference to FIG. 16A. In the passive phase array, designated generally by numeral 1710, light follows a long path, shown as a serpentine path 1703 in the figure. At equal spacings and at equal distances, some of the light is tapped out of the path and exits an output 1701. A coupler 1704 is used to take a fraction of the light out of the path.

This light then goes to the output 1701. As the wavelength changes, the phase difference between these outputs 1701 changes in a relative manner, shifting the position of an emergent beam 1710 (shown in FIG. 16B). The position of the beam 1710 switches due to the relative phases of the outputs, alone. The longer the path length between elements, the less wavelength change is needed for steering. This structure is analogous to a grating, and could also be understood by considering the locations of the output couplers as elements of a grating. FIG. 16B shows an exemplary tile 1702 with multiple outputs 1701 in which the light follows the serpentine path as shown in FIG. 16A. Light is thus emitted from the output based upon the change in wavelength. The direction of the emitted light is determined by the wavelength. If there is a single wavelength, then the light is emitted in a single direction.

For FIGS. 15 and 16A-16B, the methodology may occur as follows: first set Φ=0 and the address pointer to '0'. Data from the data store of a scene is retrieved. Each sub-hologram is illuminated as a function of the data. The methodology then increments phi and the video data pointer. The process is the looped for each data element (e.g. pixel element, sub-pixel element) until all of the data for the scene is processed.

As will be clear to those familiar with the arts of 3-D display and phased arrays, the techniques of the preceding section about active and passive filter alternatives are illustrated in a mode suitable for single-axis beam scanning, which is referred to as horizontal-parallax-only (HPO) operation in the field of 3-D display. The techniques can be extended to multi-axis (e.g. full parallax) scanning in a straightforward manner, by increasing the number of elements and appropriately arranging the multiplexing or scanning elements.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A radiation projector comprising:
   a plurality of nanophotonic antennas configured to emit electromagnetic radiation;
   a plurality of phase delay elements, each phase delay element characterized by a phase delay, at least one phase delay element associated with at least one of the plurality of nanophotonic antennas; and
   a control signal generator configured to generate a control signal associated with the plurality of delay elements, wherein the control signal generator is further configured to recurrently update phase delays of the plurality of phase delay elements in such a manner as to cause the electromagnetic radiation to substantially span at least one contiguous solid angle.

2. A radiation projector according to claim 1 wherein an output of the plurality of nanophotonic antennas generates a three dimensional light field of imagery.

3. A radiation projector according to claim 1 further comprising:
   a modulator for receiving data representative of a three dimensional scene scanned in several different directions and producing a plurality of time-varying illumination patterns.

4. A radiation projector according to claim 3 wherein the electromagnetic radiation emitted by the antennas is visible light.

5. A radiation projector according to claim 3 wherein the plurality of nanophotonic antennas is coupled to the modulator for dividing the time-varying illumination patterns into a plurality of paths, wherein a path is associated with each antenna within the array.

6. A radiation projector according to claim 5 wherein the plurality of delay elements are a plurality of phase shifters each associated with an antenna for shifting the phase of the time-varying illumination patterns collectively so that the patterns are modulated in synchrony for each of several directions.

7. A radiation projector according to claim 1, wherein the phase delay elements shift the phase in a single direction.

8. A radiation projector according to claim 1, wherein the phase delay elements shift the phase in both a horizontal and a vertical direction.

9. A radiation projector according to claim 1 further comprising:
a controller for providing phase shift control signals to each of the phase delay elements to provide a sequence of video images.

10. A radiation projector according to claim 1, wherein the phase delay elements are phase shifters and the phase shifters are associated with an array of nanophotonic antennas that represent a single pixel and the phase shifters for the single pixel receive a phase control signal in the x direction and in the y direction.

11. A radiation projector according to claim 1, wherein only two phase shift control values are needed to steer a radiation pattern from an antenna.

12. A radiation projector according to claim 1 wherein the plurality of nanophotonic antennas are divided into a plurality of arrays and each array represents a single pixel.

13. A radiation projector according to claim 1 wherein the plurality of nanophotonic antennas are divided into a plurality of arrays and each array represents a single hogel.

14. A radiation projector according to claim 1 wherein the plurality of nanophotonic antennas are divided into a plurality of arrays and each array represents a single wafel.

15. A radiation projector according to claim 1 wherein the plurality of phase delay elements is a MEMS phase shifter that mechanically alters phase based upon movement of a phase actuator.

16. A radiation projector according to claim 15 wherein the phase actuator is a membrane.

17. A radiation projector according to claim 1 further comprising:
a database containing the data representative of the three dimensional scene scanned from several different directions.

18. A radiation projector according to claim 1 wherein the emitted output radiation can be directed to converge at a spatial region, such that a viewer can view the emitted output radiation if the viewer is within the spatial region and the viewer cannot view the emitted output radiation if the viewer is outside of the spatial region.

19. A radiation projector according to claim 18 wherein the nanophotonic antennas are controlled with a second control signal to steer the emitted output radiation in a second direction.

20. A radiation projector according to claim 1, wherein the nanophotonic antennas are controlled with a first control signal to steer the emitted output radiation in a first direction.

21. A radiation projector according to claim 1, wherein the plurality of nanophotonic antennas are arranged in an array and the array is arranged on a two dimensional surface.

* * * * *